Nov. 2, 1954 R. N. STRAEHL ET AL 2,693,105
ULTRASONIC INSPECTION DEVICE
Filed Oct. 21, 1950 2 Sheets-Sheet 1
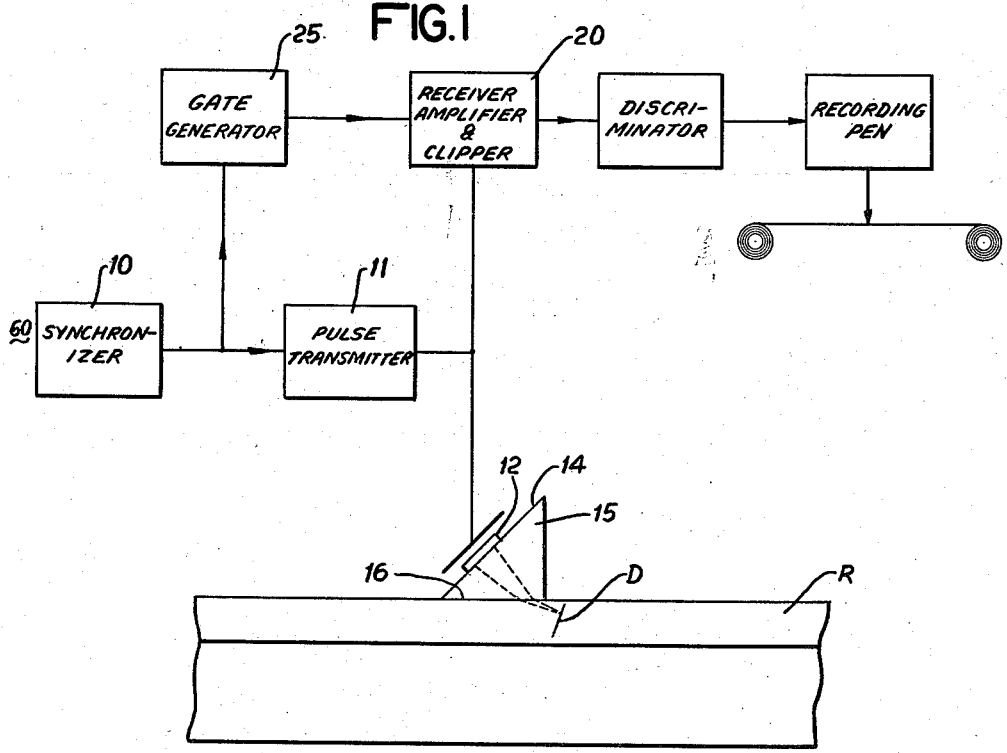
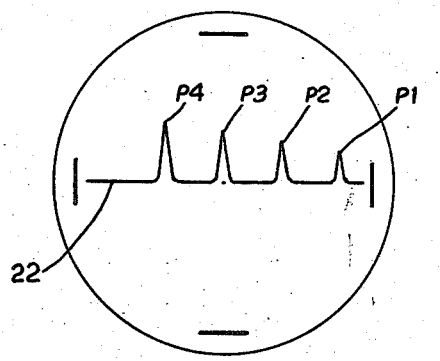
INVENTORS.
WILLIAM E. MESH
ROBERT N. STRAEHL
BY
*Joseph H. Lipschutz*
ATTORNEY.

United States Patent Office 2,693,105
Patented Nov. 2, 1954

2,693,105

ULTRASONIC INSPECTION DEVICE

Robert N. Straehl, Danbury, and William E. Mesh, Brookfield, Conn., assignors to Sperry Products, Inc., Danbury, Conn., a corporation of New York Application October 21, 1950, Serial No. 191,367

2 Claims. (Cl. 73—67)

This invention relates to the inspection of objects by the transmission therein of ultrasonic pulses and the reception of reflections of such pulses from reflecting surfaces within the object. One of the problems which arises in such testing systems is due to the fact that random reflections of the pulses are received and it is difficult to distinguish these reflections from reflections of the pulses caused by those internal defects which it is desired to detect within the object. Such reflections may be caused by random electrical signals such as arcing. This problem is particularly important where the electro-acoustic transducer which transmits and receives the pulses is moved along a surface of the object in order to scan a length or an area, because in so doing many false reflections are received due to such causes as the vibration of the transducer when passing over discontinuties such as the joints of rail in track.

It is therefore the principal object of this invention to provide means whereby only reflections from true defects within the object will be indicated, and thus discrimination will be effected between true and false reflections.

Further objects and advantages of this invention will become apparent in the following detailed description thereof.

In the accompanying drawings,

Fig. 1 is a block diagram embodying the principles of this invention.

Fig. 3 is a front elevation of an oscilloscope screen with indications illustrating the theory of this invention.

Figure 2:
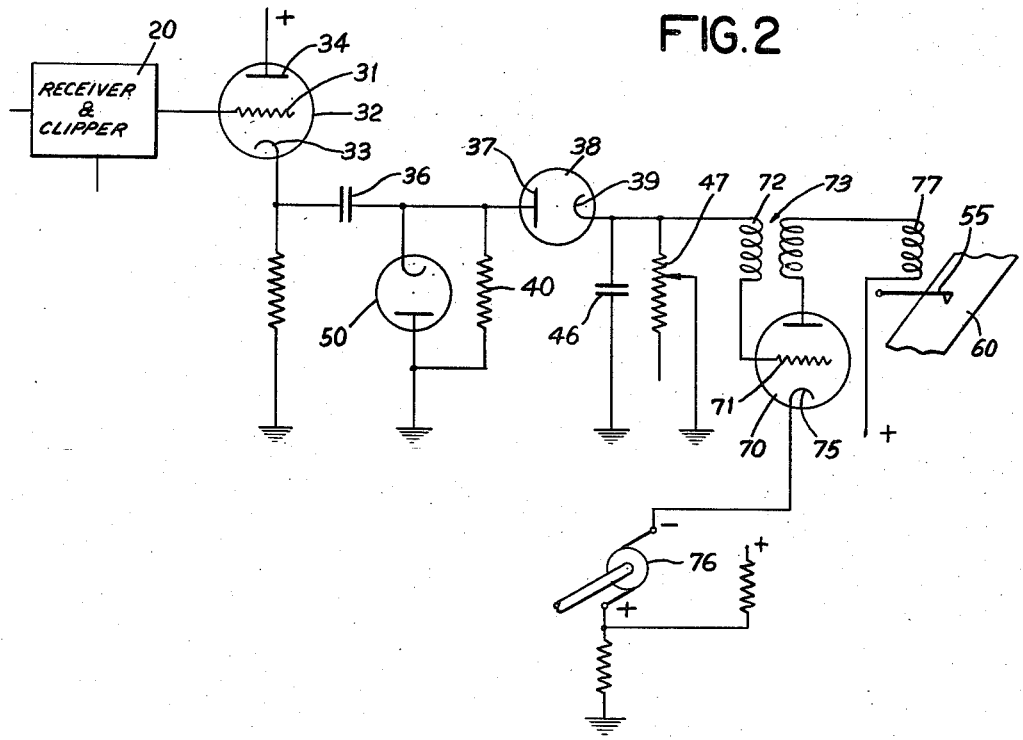
Fig. 2 is a detail showing the electrical wiring of the discriminator element of Fig. 1.

Referring to Fig. 1 of the drawings we have illustrated the invention as applied to the testing of rails for internal defects, but it will be apparent that the principles of this invention may be applied wherever objects are tested by transmitting pulses therein and receiving reflections of the pulses therefrom. A synchronizer 10 which may be periodically energized from any suitable source such as 60-cycle A. C., periodically energizes a pulse transmitter 11, which applies said pulses to an electro-acoustic transducer which may take the form of a piezo-electric crystal 12, said crystal being mounted on one surface 14 of a wedge 15 whose other surface 16 rests upon the surface of an object to be inspected, in this case the rail R. Thus periodically pulses are transmitted into the rail at a predetermined angle and if these pulses encounter an internal reflecting surface such as a defect D the pulses will be reflected back to the crystal 12. The received pulses may be indicated in any suitable manner after being amplified by an amplifier 20. Thus for example by reference to Fig. 3 it will be seen that an oscilloscope may be employed where the sweep 22 is keyed by synchronizer 10 simultaneously with the transmission of the pulses. The indication due to the application of the generated pulse to the piezo-electric crystal may be eliminated by means of a gate generator 25 which renders the receiver effective for a period beginning just after the termination of the pulse and for a predetermined time interval following the generation of the pulse. Thus the receiver 20 would transmit to an indicator such as the oscilloscope only reflections received from reflecting surfaces within the object. Since the length of sweep represents a certain time interval, the first reflection from a reflecting surface such as D would appear on the sweep at one end thereof as a vertical deviation P1. As the transducer moves toward the defect the reflections from the defect will be received in continuously shorter time intervals as vertical deviations P2, P3, P4, etc., of increasing amplitude. If the repetition rate of pulse transmission is sufficiently high relative to the movement of the transducer, the indication will appear as a single vertical deviation moving continuously from right to left, as the crystal approaches the defect, and from left to right, as the crystal moves in the reverse direction away from the defect.

The above description which indicates that a rapidly repeated pulse transmission will cause a series of pulse reflections to be received in close succession, is distinct from the case of a stray reflection due to any one of a number of causes such as vibration of the crystal on the object surface. It is this distinction which is here employed for the purpose of yielding indications only of true defects as distinct from false indications which have heretofore been caused by other than internal reflecting surfaces. The discrimination is effected by the following arrangement.

As heretofore stated the transmitted pulses and the reflections thereof both act upon the electro-acoustic transducer, but because of the gate generator 25 only the voltages generated by the transducer in response to reflections received thereby will be received by receiver 20. These reflections may include those due to sources other than internal reflecting surfaces. All of the signal voltages thus generated by the transducer in response to received reflections of all kinds are passed through the receiver amplifier 20 which may also have a clipper for clipping the output signals to uniform amplitude which are then passed through the discriminator 30 which has for its function to eliminate the false indications and pass only true indications due to internal defects.

The details of the discriminator are disclosed in Fig. 2 wherein it will be seen that the output signals from the receiver 20 are applied to the grid 31 of tube 32 which includes also a cathode 33 and a plate 34. Each positive pulse occurring on the grid of tube 32 is passed by capacitor 36 to the anode 37 of a diode 38 which also has a cathode 39. Initially the cathode 39 is at ground potential. Also, the anode potential of anode 37 is zero since resistor 40 is connected to ground. At the instant when the potential of anode 37 begins to rise due to the positive pulse, tube 38 begins to conduct since its anode becomes positive with respect to its cathode. Assuming that the forward resistance of diode 38 is negligible the full voltage appearing on the cathode 33 of tube 32 is distributed across capacitors 36 and 46 inversely as the value of their respective capacities. For example, if capacitor 36 is 1/100 the value of capacitor 46, 1/100 of the total voltage will appear on capacitor 46. When the cathode 33 returns to its initial voltage at the end of the pulse, diode 38 will cease conducting and allow its cathode potential to remain positive. A diode 50 will commence conducting at this point and will quickly remove the accumulated charge on capacitor 36 which is 99 percent of the total voltage (in the example chosen). Immediately following the first pulse, therefore, capacitor 36 is restored to its initial state but capacitor 46 retains a small charge. Each succeeding pulse would cause an additional charge to be applied to capacitor 46 and when the charge builds up to a sufficient degree it would operate an indicator such as a pen 55 on a moving chart 60, by means to be described hereinafter.

Figure 4:
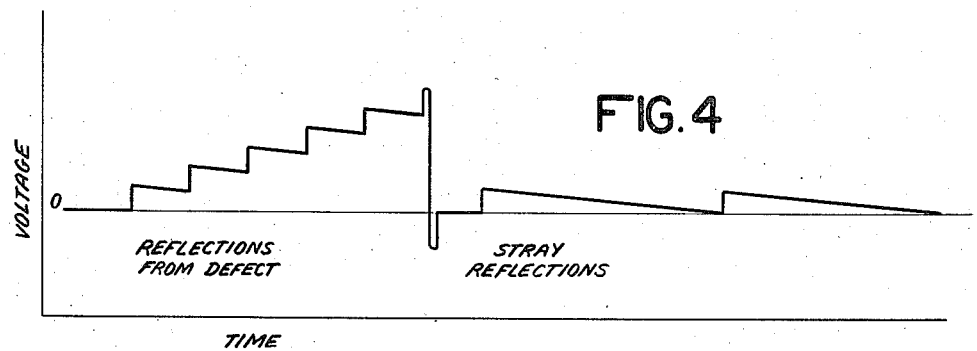
Fig. 4 is a graph illustrating the action of the discriminator of Figs. 1 and 2.

If the system were as described above there would be no discrimination between those pulses due to stray reflections and those pulses due to reflections from an internal reflecting surface which it is desired to detect, because each of these would be additive and no distinction would be possible. In order to effect the necessary distinction we make use of the fact set forth hereinbefore, i. e., that reflections from the true defect are received at a relatively rapid repetition rate in response to a relatively rapid transmission pulse rate, whereas stray reflections do not repeat at short time intervals with the same regularity. Therefore in the discriminator circuit hereinbefore described there is introduced a variable resistor 47 which constitutes a leak to permit the accumulated charge on capacitor 46 to leak off to ground. The rate of leakage may be controlled by the setting of the variable resistor. This rate is set so that there will be relatively little leakage from capacitor 46 in the interval between received reflections from an internal reflecting surface so that the voltage on capacitor 46 can be built up as shown in the left-hand portion of the Fig. 4 graph. In the case of stray reflections however long time intervals occur between received stray reflections and therefore the charge on capacitor 46 decays sufficiently so that there is no build-up to the point where the charge on capacitor 46 may operate the indicator mechanism. In this manner discrimination is made between the relatively rapid repetition rate of reflections from a true defect within the object and the relatively slow repetition rate of stray reflections.

The manner in which the voltage on capacitor 46 operates the indicating mechanism when the voltage has built up to the predetermined degree, may comprise a blocking oscillator which includes a tube 70 having a grid 71 upon which the voltage of capacitor 46 is placed through winding 72 of a transformer 73. The cathode 75 of the tube 70 may have a bias applied thereto which is a function of the rate of movement of the transducer. For this purpose the moving transducer may operate a voltage generator 76 to generate a voltage which is a function of the rate of movement of the transducer to reduce the positive bias voltage on cathode 75 as the car speed increases. With this arrangement, more pulses will be required to fire the blocking oscillator when the car is moving slowly. When the voltage on grid 71 reaches a point where the difference between it and the cathode bias voltage is low enough to permit plate current to flow, the blocking oscillator circuit cycles once and sends a signal to the relay 77 of the recording circuit to cause it to actuate pen 55 on chart 60. During the blocking oscillator action, the voltage on grid 71 is driven in a negative direction and would normally go far below zero, causing a negative charge to be left on capacitor 46. This is prevented by the action of diodes 38 and 50. Since the anode of diode 50 is connected to ground, diode 50 will conduct at the instant its cathode becomes negative with respect to ground. Similarly, diode 38 will conduct when its cathode becomes negative with respect to its anode. Since these two diodes are connected in series from capacitor 46 to ground, they will both conduct when the voltage on capacitor 46 is driven negative. Hence the charge remaining on capacitor 46 following a blocking oscillator cycle is essentially zero.

It has thus been shown how a series of pulses occurring at a repetition rate which permits voltage build-up on capacitor 46 faster than the voltage can leak off through resistor 47 will cause operation of the recording mechanism. Such a repetition rate occurs in the case of reflections received from an internal reflecting surface which is a true defect. Such a rate of accumulation of voltage on capacitor 46 will not take place in the case of stray reflections because the repetition rate at which they occur is such that whatever voltage is applied by such stray reflections to capacitor 46 will have time to leak off through resistor 47 before any appreciable build-up can take place. This is illustrated graphically in the right hand side of Fig. 4. In this manner only indications of true defects will be recorded.

Having described our invention, what we claim and desire to secure by Letters Patent is:

1. In an ultrasonic inspection device, means for periodically generating an ultrasonic pulse, an electro-acoustic transducer actuated by said pulse generating means for transmitting said pulses into an object to be inspected and for receiving reflections of the pulse from within the object, means for supporting the transducer at an angle to said object, the transducer being movable relative to the object at a predetermined rate, means operatively connected to said transducer for accumulating the signal voltages generated by the transducer in response to reflections of the pulse received from within the object, means for causing decay of said accumulated voltages at a predetermined rate which is less than the increment of signal voltage for each reflection, means for generating a second voltage as a function of the rate of movement of the transducer and of opposite sign to said accumulated voltage, indicating means, operating means for said indicating means adapted to be rendered effective by a predetermined voltage, and means for actuating said operating means by the differential of said accumulated and said second voltages.

2. A device as specified in claim 1, in which the operating means comprises a tube having anode, grid and cathode, means for applying the accumulated signal voltages to the grid, means for applying said second voltage to the cathode, and means whereby the output at the anode is connected to said indicating means for actuating the same.

References Cited in the file of this patent

UNITED STATES PATENTS

| Number | Name | Date |
|---|---|---|
| 1,933,976 | Hanson | Nov. 7, 1933 |
| 2,406,316 | Blumlein et al. | Aug. 27, 1946 |
| 2,415,918 | Thomas | Feb. 18, 1947 |
| 2,430,038 | Wertz | Nov. 4, 1947 |
| 2,524,837 | Russell et al. | Oct. 10, 1950 |
| 2,532,347 | Stodola | Dec. 5, 1950 |
| 2,534,006 | De Lano et al. | Dec. 12, 1950 |
| 2,549,022 | Shenk et al. | Apr. 17, 1951 |

OTHER REFERENCES

"Ultrasonics" by Carlin (McGraw-Hill, N. Y.), 1944.